United States Patent
Nichols et al.

[11] Patent Number: 5,749,343
[45] Date of Patent: May 12, 1998

[54] ADAPTIVE ELECTRONIC THROTTLE CONTROL

[75] Inventors: Gary Arthur Nichols, Farmington Hills; Roger Allen Clark, Waterford, both of Mich.

[73] Assignee: General Motors Corporation, Detroit, Mich.

[21] Appl. No.: 729,750

[22] Filed: Oct. 7, 1996

[51] Int. Cl.[6] .......................... F02D 11/10; F02D 41/04
[52] U.S. Cl. ........................................ 123/350; 123/396
[58] Field of Search ................................ 123/350, 396, 123/320, 399

[56] References Cited

U.S. PATENT DOCUMENTS 4,691,676  9/1987  Kikuchi ............................ 123/399
5,349,932  9/1994  Boverie et al. .................... 123/399
5,595,159  1/1997  Huber et al. ...................... 123/396

*Primary Examiner*—Andrew M. Dolinar
*Attorney, Agent, or Firm*—Michael J. Bridges

[57] ABSTRACT

An adaptive electronic throttle control system for internal combustion engine intake air rate control selectively adapts the responsiveness of the intake air rate control to maintain synchronism with other engine control systems including fuel control and dilution control systems according to the responsiveness of such other control systems and, as indicated by current engine operating conditions, according to the need to maintain synchronism to minimize emissions and maximize performance and stability.

8 Claims, 3 Drawing Sheets

ADAPTIVE ELECTRONIC THROTTLE CONTROL

FIELD OF THE INVENTION

This invention relates to automotive vehicle controls and, more particularly, to an adaptive electronic throttle control method.

BACKGROUND OF THE INVENTION

It is known to electronically control the position of an internal combustion engine intake air (throttle) valve within an engine intake air bore to vary restriction of intake air passing through the bore and to the engine. Such control has been termed electronic throttle control. Typically in electronic throttle control, an electromechanical actuator is mechanically linked to the intake air valve and electrically driven to vary intake air valve position. When designing an electronic throttle control system, the criteria for selecting an appropriate electromechanical actuator include actuator response criteria. Generally, the system and therefore the actuator must be sufficiently responsive to changing conditions to meet or exceed engine operator expectations. For example, under high load conditions, such an actuator must be highly responsive to a position command change to meet generally accepted operator expectations. Intake air valve control actuators are therefore typically highly responsive devices.

Not all engine control systems are as responsive as intake air valve control systems that include such highly responsive actuators. Nonetheless, the response of various engine control systems must correlate. Specifically, fuel control and exhaust gas recirculation (dilution) control systems must control in synchronism with intake air valve control systems. Typically however, fuel and dilution control systems are not as responsive to changing control conditions as is the intake air valve control system. Accordingly, under conditions in which high performance intake air valve control is required, fuel control or dilution control responsiveness may lag significantly behind that of the intake air valve control system, leading to deviation in engine air/fuel ratio away from a desired air/fuel ratio, or leading to an undesirable level of engine intake air dilution. Engine emissions may increase and engine performance may decrease as a result.

As the magnitude of any such performance lag decreases, engine performance may significantly increase, causing a significant and perhaps sudden increase in engine output torque which may be perceived as an engine instability and which may accelerate engine driveline component wear.

Solutions to the described response shortcomings of conventional powertrain control systems include use of lower performance intake air valve control actuators, sophisticated and expensive fuel control alternatives, or less aggressive dilution control strategies. Such solutions can reduce overall engine performance and increase engine emissions, and can add significantly to engine expense.

It would therefore be desirable, throughout the range of operation of an engine that includes high performance intake air valve control, to meet engine operator performance expectations without compromising engine performance or emissions levels and at minimum cost.

SUMMARY OF THE INVENTION

The present invention provides an adaptive electronic throttle control which selectively varies intake air valve control response when required to correspond to responsiveness of other control systems to which the intake air valve control must be synchronized for high performance powertrain control with minimized emissions and at minimum cost.

More specifically, following determination of an intake air valve control command, the command is adapted under certain operating conditions as a function of responsiveness of other engine or powertrain control systems, such as fuel control systems or dilution control systems. Under operating conditions such as high engine load conditions in which highly responsive intake air valve position control is required and does not significantly lead the responsiveness of other control systems, no limiting may be required. However, under operating conditions, such as near engine idle, in which intake air valve control responsiveness is not critical and under which fuel control or dilution control substantially lags intake air valve control, the responsiveness of the intake air valve control to a required change in intake air valve position is reduced. In accord with a further aspect of this invention, the intake air valve limiting may vary depending on whether an opening or a closing of the intake air valve is required, so that close modeling of the relative phase between intake air valve control and other control such as fuel or dilution control is provided and a desirable phase relationship between such control systems is maintained under all operating conditions.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
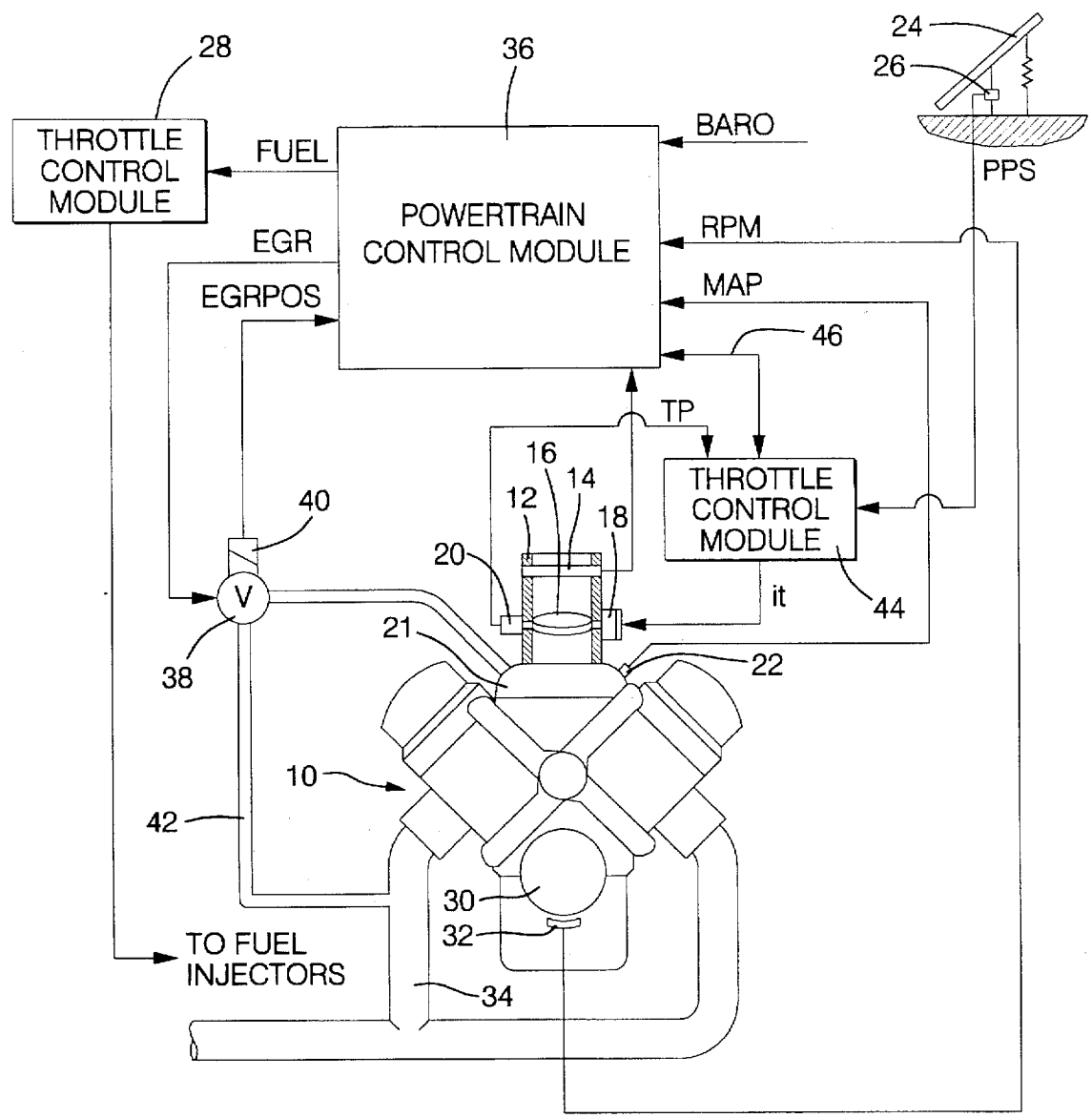
FIG. 1 is general diagram of an internal combustion engine and engine control hardware for carrying out the preferred embodiment of this invention.

Referring to FIG. 1, intake air is passed through intake air bore 12 past mass airflow meter 14 of the thick film or hot wire type for transducing engine intake air mass flow rate into output signal MAF. An electronically-controlled intake air valve 16 for example of the butterfly or rotary type is disposed in intake air bore 12 and rotates therein to vary a degree of restrictiveness of the intake bore 12 to intake air passing therethrough. An electromechanical actuator 18, for example of the DC motor or stepper motor type includes a rotatable output shaft (not shown) mechanically linked to the valve 16, such as through a gear assembly (not detailed). The rotational position of the output shaft of actuator 18 is controlled through variation in an electrical current command $i_r$ issued by throttle control module 44, for example through pulsewidth modulation control of the four gates of a commercially available full H-bridge (not shown) for bi-directional current control. Through timed variation in the magnitude of $i_r$, high resolution, highly responsive control of engine intake air valve position is provided for engine intake air rate control. Actuator 18 may be any commercially-available high performance electromechanical actuator that provides high performance dynamic positioning, as is well-established as required in electronic throttle control applications under certain engine operating conditions, such as high engine intake air rate (high engine load) operating conditions. The rotational position of the intake air valve 16 is transduced by potentiometric position sensor 20 of any conventional type into output signal TP.

Throttle control module 44 includes a conventional controller architecture of such well-known elements as a central processing unit (not shown) and input/output circuitry (not shown). Generally, the throttle control module 44 receives engine operating condition information from a powertrain control module 36 across bi-directional serial data link 46, and receives transducer signals and generates, through execution of a series of stored instructions in the form of a control routine, an intake air valve position command which, as described, is converted into an actuator drive current $i_t$ for driving output shaft of actuator 18 toward a desired rotational position. Signal Tp is received by the throttle control module 44 for closed-loop control operations, to be described.

An operator-controlled accelerator 24 takes the form of a pedal which is manually depressed by a vehicle operator to indicate a desired engine operating level. The degree of depression of the pedal away from a rest position is transduced by conventional potentiometric position sensor 26 into output signal PPS, which is provided as a control input to throttle control module 44 as an indication of a desired engine operating level.

The intake air passing across intake air valve 16 is received in an intake manifold 21 for distribution to intake runners of a plurality of engine cylinders (not shown). Intake air absolute pressure in the intake manifold 21 is transduced by conventional pressure transducer 22 into output signal MAP. Ambient barometric pressure is transduced by a conventional barometric pressure sensor (not shown) or, alternatively, under specified operating conditions, such as conditions in which the pressure drop across the intake air valve 16 is substantially zero, is set to the pressure value represented by signal MAP.

The intake air is combined with an injected fuel quantity and delivered to engine cylinders for combustion therein for reciprocally driving pistons (not shown) within the cylinders, the pistons being mechanically linked to an engine output shaft 30 to rotatably drive the output shaft. The rate of rotation of the output shaft 30 is termed engine speed and is transduced by conventional Hall effect or variable reluctance transducer 32 positioned in close proximity to the output shaft to transduce passage of teeth or notches (not shown) formed on the output shaft into cycles of transducer output signal RPM. Gasses produced in engine cylinders during the combustion process are guided out of the cylinders and through exhaust gas conduit 34.

An exhaust gas recirculation conduit 42 opens, on a first end, into the exhaust gas conduit 34 and on a second end opposing the first end, into intake manifold 21 to provide for recirculation of exhaust gas from the exhaust gas conduit into the intake manifold to dilute engine intake air and thereby reduce oxygen content of the intake air and reduce combustion temperatures, consistent with generally recognized procedures to reduce the engine emissions component of oxides of nitrogen NOx. An EGR valve 38 of the electrically-controlled solenoid type is disposed in the recirculation conduit 42 and is responsive to control signal EGR for varying restriction to flow of exhaust gas through the conduit to provide for control of intake air charge dilution. Potentiometric position sensor 40 is associated with the valve 38 in such a manner that a movable sensing element such as a wiper arm moves with a pintle (not shown) of the valve 38 to vary sensor output signal EGRPOS which indicates the degree of restriction imposed by the controlled valve position.

A powertrain control module 36 includes a microcontroller device of any conventional design with standard control and logic circuitry and standard memory devices including read only memory devices in which are stored a plurality of routines for carrying out engine control and diagnostic operations. Each routine includes a sequence of instructions which are executed by the microcontroller following preestablished engine events or on a timed basis. One such routine, which may be repeatedly executed following each successive engine cylinder event while the engine is operating is a fuel control routine for generating and issuing to fuel controller 28 a fuel command FUEL in the form of a pulse width corresponding to a desired fuel injector open time during which pressurized fuel is passed through the fuel injector for an active engine cylinder to provide for a desired engine cylinder air/fuel ratio. Command FUEL is processed by fuel controller 28 into a drive current $i_f$ which is applied to the fuel injector for an active engine cylinder (the cylinder about to undergo its compression stroke). As described, the injected fuel quantity is mixed with an inlet air quantity in an intake runner or directly in an engine cylinder and is ignited in the engine cylinder.

The powertrain control module 36 receives a plurality of input signals including the described transducer output signals EGRPOS, MAF, MAP, RPM, and BARO, and, through execution of the described routines, generates command FUEL, and other control commands including an ignition timing control command. A serial data link 46 of any suitable conventional type provides for bidirectional data transfer between standard input/output circuitry of the powertrain control module 36 and throttle control module 44. Information on a current engine operating condition may be communicated across the link 46 to the throttle control module 44, including information on current engine speed and engine load. The throttle control module may return information to the powertrain control module 36 across the link 46 such as current pedal position derived from signal PPS, and a commanded intake air valve position.

Figure 2:
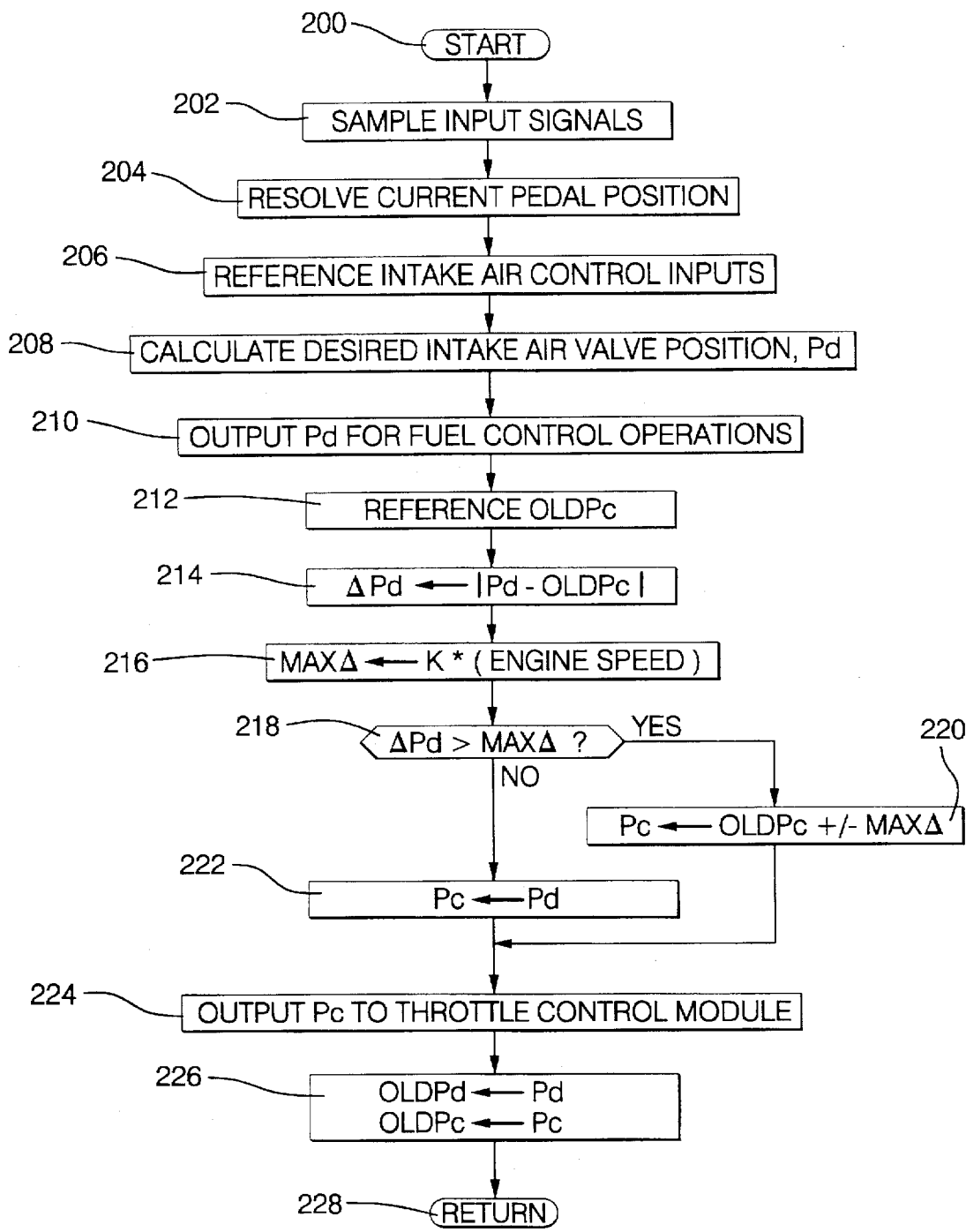
FIGS. 2–3 are computer flow diagrams illustrating a flow of operations for carrying out the engine control method of this embodiment using the hardware of FIG. 1.

The specific operations for generating the intake air valve control command and for issuing the command to the throttle control module over the serial data link 46 are illustrated in FIG. 2 in a step by step manner, beginning at a step 220. The operations of FIG. 2 are carried out about every 18.75 milliseconds during an engine ignition cycle. A engine ignition cycle is defined as the engine operating period following manual application by an engine operator of ignition power to the powertrain control module 36 of FIG. 1.

The operations of FIG. 2 provide for generation of a desired intake air command to provide for high performance engine operation with low engine emissions, and for intake air command rate of change limiting in accord with this invention to maintain synchronism with other engine control processes including fuel control and dilution control processes. More specifically, the routine is initiated at the step 200 and proceeds to sample input signals, including the described RPM, MAP, MAF, EGRPOS, and BARO signals at a next step 202. Serial data from the link 46 may further be processed at the step 202, including a current PPS value indicating current displacement of the pedal 24 away from a rest position and a most recent determined Pv value indicating current intake air valve position as a function of signal Tp. A current pedal position is next resolved at a step 204 as a function of the received PPS signal information from the serial link 46. Intake air control inputs are next referenced at a step 206 as the input function values that may contribute to a desired intake air valve position including current pedal position, an output value from a conventional throttle follower function, cruise control function, traction control function, and anti-lock braking control function, all of which may be active from time to time during an engine ignition cycle to influence the desired intake air valve position in a manner generally understood in the art.

A desired intake air valve position Pd is next calculated at a step 208 as a predetermined function of the values referenced at the step 206.

The value Pd is next output at a step 210 for use by the fuel control operations which generally will determine a desired engine fueling rate in the form of a fuel command so that the mixture of the intake air passing across the intake air valve and the delivered fuel quantity will provide for a desirable engine air/fuel ratio, such as the stoichiometric ratio. The process of outputting Pd may be any process for making the calculated Pd value available for use in the described fuel control operations including, for example, storing Pd in an area of memory to which the fuel control operations have access.

Following the step 210, a most recent prior stored intake air valve position command, termed OLDPc, is referenced at a step 212 and the magnitude of the difference between OLDPc and Pd, termed ΔPd is determined at a next step 214 to indicate a current time rate of change in commanded position from the most recent prior issued position command to the current desired position of the intake air valve. A permitted maximum time rate of change MAXΔ is next determined at a step 216 as a function proportional to engine speed as indicated by signal RPM of FIG. 1, as follows:

$$MAX\Delta = K * RPM$$

in which the gain K is established through a conventional calibration process through observation of the maximum controllable time rate of change in engine fueling or engine dilution or any other engine control process which must be coordinated with the engine intake air control process as a function of engine speed. For example, in this embodiment, K is set so no more than an eight percent increase in airflow per engine cylinder is permitted for each 120 degrees of engine output shaft 30 (FIG. 1) rotation. The linear model of the limit MAXΔ of this embodiment is just one example of the variety of intake air valve position change limit models due to response limitations of other control processes such as fueling or dilution control processes that may be used in accord with this invention. Non-linear models that incorporate information on variation in engine speed and variation of other engine parameters such as engine load, engine temperature, actuator supply voltage, etc. may be used to generate the limit value MAXΔ. For example, as engine temperature increases, fuel and dilution control system response may vary. The model may account for such variation by varying the limit MAXΔ so that the intake air control system response varies with the response of such other systems. Indeed, any condition that is determined to affect the response of any system that should be synchronized with intake air control system may be included in the model used to generate MAXΔ. A conventional calibration process may be used to generate the model, which may be stored as a mathematical function responsive to a plurality of engine parameters such as engine speed, temperature, airflow, etc. or may be stored in the form of a conventional lookup table.

Returning to FIG. 2, after determining MAXΔ at the step 216, ΔPd is compared to MAXΔ at a next step 218. If the time rate of change in desired intake air valve position exceeds its limit as determined at the step 218, an intake air valve position command Pc is determined at a next step 220 as a combination of a most recent prior determined position command OLDPc and the limit value MAXΔ. More specifically, if the intake air valve position is increasing, the command Pc is a sum of OLDPc and MAXΔ, and if the intake air valve position is decreasing, the command Pc is a difference between OLDPc and MAXΔ, so that the current command is no more than MAXΔ away from the most recent prior command OLDPc. Returning to step 218, if ΔPd is not greater than MAXΔ, the current desired change in intake air valve position is not greater than the determined limit, and the intake air valve command Pc may be set to the current desired valve position Pd at a next step 222. Next, or following the described step 220, the command Pc is output to powertrain control module input/output control circuitry for serial transmission to the throttle control module 44 across the serial data link 46.

Figure 3:
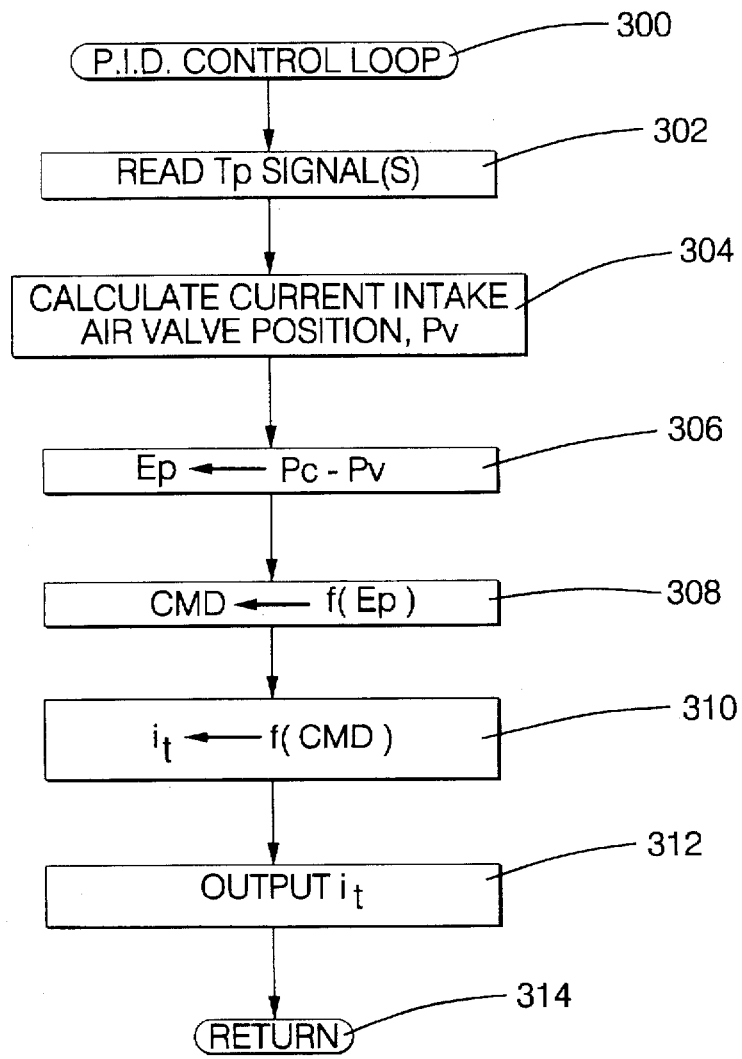

The command Pc is applied in a closed-loop intake air valve position control function carried out through a series of throttle control module 44 operations, illustrated in a step by step manner in FIG. 3, to be described. Returning to FIG. 2, after ouputting PC to the throttle control module across link 46, the current values of Pd and Pc are stored in a standard memory device of the controller 36 of FIG. 1 for use in the next iteration of the routine of FIG. 2. The desired intake air valve position Pd is stored at the step 226 as OLDPd, and the valve command Pc is stored as OLDPc. The routine of FIG. 2 then concludes by returning, via a next step 228, to any operations that were ongoing and may have been temporarily suspended to allow for execution of the operations of FIG. 2, such as other control operations, or conventional diagnostic or maintenance operations.

Referring to FIG. 3, a series of control operations making up a control loop intended to be executed by the controller of the throttle control module 44 of FIG. 1 about every three milliseconds throughout engine ignition cycles is illustrated, taking the form in this embodiment of a proportional-plus-integral-plus-derivative control function but intended to extend to any modern or classical control strategy through application of ordinary skill in the art. The control operations of FIG. 3 are intended generally to controllably drive actual intake air valve position, indicated by signal Tp, toward a desired position represented by Pc to provide for desirable engine performance and emissions. Specifically, upon each occurrence of a time-based interrupt or event, about every three milliseconds in this embodiment, the operations of FIG. 3 commence at a step 300 and proceed to read a current value of signal Tp at a next step 302. A current intake air valve position Pv is next determined at a step 304 as a function of TP. For example a plurality of sampled or read TP values may be passed through a conventional lag filter process to arrive at a Pv value at the step 304. An intake air valve position error value Ep is next determined at a step 306 as a difference between Pc, which was determined through the operations of FIG. 2, as described, and Pv. The error value Ep is to be controllably minimized through the control operations of FIG. 3. A control command to be issued to the intake air valve actuator is next determined as a function of Ep, for example as follows:

$$CMD = Kp * Ep + Ki * \int (Ep)dt + Kd * d(Ep)/dt$$

in which respective proportional, integral and derivative gains Kp, Ki, and Kd are determined through conventional calibration procedures in accord with application-specific closed-loop control performance criteria. The command CMD is next applied to drive circuitry at a step 310 to generate a corresponding current command $i_t$ suitable for application to the actuator 18 of FIG. 1. For example, CMD may take the form of a duty cycle command which is applied to high current switches of a conventional H-bridge current to orient the H-bridge to generate a required drive current. The drive current $i_r$ is then applied by the drive circuitry to the actuator 18 at a next step 312 to drive the actuator output shaft to a desired rotational position. The routine of FIG. 3 then concludes by returning, via a next step 314, to resume execution of any prior operations that were ongoing prior to execution of the operations of FIG. 3 and that may have been suspended to allow for execution of the operations of FIG. 3.

The preferred embodiment for the purpose of explaining this invention is not to be taken as limiting or restricting the invention since many modifications may be made through the exercise of ordinary skill in the art without departing from the scope of the invention.

The embodiments of the invention in which a property or privilege is claimed are described as follows:

1. An adaptive electronic throttle control method for adapting internal combustion engine intake air control system responsiveness, comprising the steps of:

establishing a response value representing responsiveness of an engine parameter control system that is controlled substantially in synchronish with the intake air control system to change in an engine operating condition;

determining a change limit as a function of the established response value;

sensing a change in a commanded engine operating condition;

generating a commanded change in engine intake air rate as a function of the sensed change;

comparing the commanded change to the change limit;

limiting the commanded change in engine intake air rate to the change limit when the commanded change exceeds the change limit; and controlling engine intake air rate in accordance with the limited commanded change.

2. The method of claim 1, wherein the predetermined engine parameter control system is a fuel control system.

3. The method of claim 1, wherein the predetermined engine parameter control system is a dilution control system.

4. A method for controlling an opening of an internal combustion engine intake air valve, comprising the steps of:

estimating a schedule of response limits of a fuel control system of the engine as a function of an engine parameter over an engine operating range;

establishing a schedule of difference limits as a function of the schedule of response limits;

generating a desired intake air valve opening value;

referencing a stored command value indicating a prior intake air valve opening command;

determining a difference value representing a difference between the desired intake air valve opening value and the referenced command value;

sampling an input signal indicating a current value of the engine parameter;

selecting an active difference limit from the schedule of difference limits as a function of the sampled input signal;

comparing the determined difference to the active difference limit;

calculating a current command value as a function of the stored command value and the difference limit when the determined difference exceeds the difference limit to limit change in opening of the intake air valve; and controlling the degree of opening of the intake air valve in accordance with the current command value.

5. The method of claim 4, further including a dilution control system for diluting engine intake air with engine exhaust gasses, the dilution control system characterized by a dilution response limit, the method further comprising the steps of:

combining engine intake air with the delivered fuel to form an air-fuel mixture;

igniting the air-fuel mixture in a combustion process thereby producing the exhaust gasses;

operating the dilution control system to recirculate a portion of the exhaust gasses for diluting the intake air; and estimating a schedule of dilution control system response limits as a function of the engine parameter over the engine operating range;

and wherein the establishing step establishes a schedule of difference limits as a function of the estimated schedule of response limits of the fuel delivery system and of the estimated schedule of dilution control system response limits.

6. An adaptive electronic throttle control method for adapting the responsiveness of an internal combustion engine intake air control system to change in engine operating conditions, comprising the steps of:

varying a predetermined engine operating parameter over an engine operating range;

measuring response of an engine parameter control system that is controlled substantially in synchronish with the intake air control system to a change in an engine operating condition over the engine operating range as a function of the engine operating parameter;

generating a schedule of limit values as a function of the measured response over the engine operating range;

sensing a change in a commanded engine operating condition;

generating a commanded change in engine intake air rate as a function of the sensed change;

sampling an input signal indicating a current value of the engine operating parameter;

referencing an active limit value from the schedule of limit values as a function of the sampled input signal;

comparing the commanded change to the active limit value;

limiting the commanded change in engine intake air rate to the active limit value when the commanded change exceeds the active limit value; and controlling engine intake air rate in accordance with the limited commanded change.

7. The method of claim 6, wherein the predetermined engine parameter control system is a fuel control system.

8. The method of claim 6, wherein the predetermined engine parameter control system is a dilution control system.

* * * * *